United States Patent
Wang et al.

(10) Patent No.: US 10,753,775 B1
(45) Date of Patent: Aug. 25, 2020

(54) OPTICAL FIBER FLOW SENSOR

(71) Applicants: Laser Institute of Shandong Academy of Science, Jining (CN); Qilu University of Technology, Ji'nan (CN)

(72) Inventors: Yingying Wang, Ji'nan (CN); Gangding Peng, Ji'nan (CN); Chang Wang, Ji'nan (CN); Jiasheng Ni, Ji'nan (CN); Qingchao Zhao, Ji'nan (CN); Faxiang Zhang, Ji'nan (CN); Shaodong Jiang, Ji'nan (CN); Long Ma, Ji'nan (CN)

(73) Assignees: Laser Institute of Shandong Academy of Science, Jining (CN); Qilu University of Technology, Ji'nan (CN)

( * ) Notice: Subject to any disclaimer, the term of this patent is extended or adjusted under 35 U.S.C. 154(b) by 0 days.

(21) Appl. No.: 16/515,310

(22) Filed: Jul. 18, 2019

(30) Foreign Application Priority Data

Jun. 14, 2019 (CN) .......................... 2019 1 0513712

(51) Int. Cl.
*G01F 1/66* (2006.01)
*G01F 1/28* (2006.01)

(52) U.S. Cl.
CPC ................ *G01F 1/28* (2013.01); *G01F 1/661* (2013.01)

(58) Field of Classification Search
CPC .... G01F 1/661; G01D 5/353; G01D 5/35303; G01D 5/35312
See application file for complete search history.

(56) References Cited

U.S. PATENT DOCUMENTS

| | | | |
|---|---|---|---|
| 2004/0046110 A1* | 3/2004 | Peng ....................... | G01F 1/661 250/227.14 |
| 2014/0116138 A1* | 5/2014 | Sheverev ............. | G01N 17/008 73/579 |
| 2018/0266240 A1* | 9/2018 | Jaaskelainen ........ | G01N 29/024 |

* cited by examiner

*Primary Examiner* — Jonathan M Hansen
(74) *Attorney, Agent, or Firm* — Reising Ethington, P.C.

(57) ABSTRACT

An optical fiber flow sensor, including: a housing, an elastic component, an optical fiber detection component, a floating element, and a fixed sealing joint. The elastic component includes a first and second elastic members that are symmetrical and are disposed in a closely fitted manner, with fitting surfaces of the first and the second elastic members being respectively provided with a corresponding seating groove. The optical fiber detection component is disposed in the seating grooves, and both ends of the optical fiber detection component are welded in the seating grooves via a glass solder. The elastic component is enclosed in the housing, and one end of the housing is fixed at the fixed sealing joint. The optical fiber detection component is sealed within the elastic component so as to avoid direct contact with an external fluid, and prevent damage by corrosion, hydrogen loss, or the like. The optical fiber detection component is welded to the elastic component via a glass solder, thereby avoiding a high-temperature creep deformation of the glue and thermal mismatch.

10 Claims, 4 Drawing Sheets

OPTICAL FIBER FLOW SENSOR

CROSS-REFERENCE TO RELATED APPLICATIONS

The present application claims priority under 35 U.S.C 119(a) to Chinese Application No. 201910513712.6, filed on Jun. 14, 2019, which is incorporated herein by reference in its entirety.

TECHNICAL FIELD

This application relates to the technical field of optical fiber monitoring sensors, and in particular, to an optical fiber flow sensor.

BACKGROUND

An optical fiber sensor is a sensor that converts a state of an object to be measured into a measurable optical signal, and can be applied in monitoring fields of liquid level, pressure, deformation, temperature, flow velocity, and the like. An optical fiber flow sensor is more widely applied to engineering fields of seas, oilfields, and the like due to its advantages of high sensitivity, anti-electromagnetic interference, being easy for wavelength division multiplexing, and the like.

An optical fiber flow sensor monitors a flow velocity via a fiber detection element by a corresponding metal structure. In an optical fiber flow sensor, the fiber detection element needs to be sensitized and packaged, and usually is attached at a surface of a substrate material, such as a metal beam, by means of glue.

When the fiber detection element is attached on the metal beam, there would be a relatively large difference between expansion coefficients of the fiber detection element and the metal beam. In this case, a thermal mismatch phenomenon would arise under influence of temperature; and under influence of a high temperature, the glue becomes extremely unstable and a creep deformation would occur, thus resulting in an inaccurate final measurement result, and even a problem that the optical fiber flow sensor fails. In addition, use of an optical fiber flow sensor would lead to a contact-type measurement, in such a case, the fiber detection element, serving as a core measurement element, easily suffers from a hydrogen loss and corrosion. Therefore, an optical fiber flow sensor cannot be used for a long-run monitoring in severe environments such as an oil well and seawater.

SUMMARY

This application provides an optical fiber flow sensor to resolve the technical problem that an optical fiber flow sensor in prior art cannot be adapted to severe environments of high temperatures, high corrosion, and the like.

To resolve the foregoing technical problem, embodiments of this application disclose the following technical solutions.

An embodiment of this application discloses an optical fiber flow sensor, wherein the optical fiber flow sensor includes: a housing, an elastic component, an optical fiber detection component, a floating element, and a fixed sealing joint, wherein the elastic component includes a first elastic member and a second elastic member that are symmetrical to each other and are disposed in a closely fitted manner, with the fitting surfaces of the first elastic member and the second elastic member being both provided with a seating groove, and the two seating grooves being corresponded to each other;

one end of the elastic component is fixed at the fixed sealing joint, and the other end is fixed at the floating element;

the optical fiber detection component is disposed in the seating grooves, with both ends of the optical fiber detection component being welded in the seating grooves by a glass solder; and the elastic component is embedded in the housing, and one end of the housing is fixed at the fixed sealing joint via thread.

Optionally, in the foregoing optical fiber flow sensor, the seating groove includes a first seating portion and a second seating portion, with a middle portion of the seating groove being the second seating portion and the two ends of the seating groove forming the first seating portion;

the first seating portion is configured for welding fibers at both ends of the optical fiber detection component, and the second seating portion is configured for accommodating a sensitive element in the optical fiber detection component in a suspended manner; and a size of the first seating portion matches with a diameter of the fiber, and a size of the second seating portion is greater than that of the sensitive element.

Optionally, in the foregoing optical fiber flow sensor, the first elastic member is welded to the second elastic member.

Optionally, in the foregoing optical fiber flow sensor, the elastic component includes a sheet-like elastic component and a column-like elastic component.

Optionally, in the foregoing optical fiber flow sensor, both ends of the sheet-like elastic component are provided with a first fixing hole, one end of the fixed sealing joint that is connected to the sheet-like elastic component is provided with a second fixing hole, and one end of the floating element that is connected to the sheet-like elastic component is provided with a third fixing hole, with the second fixing hole and the third fixing hole respectively corresponding to the first fixing holes at two ends of the sheet-like elastic component, wherein screws are respectively used for fixed connection.

Optionally, in the foregoing optical fiber flow sensor, both ends of the column-like elastic component are provided with an external thread, the end of the fixed sealing joint that is connected to the sheet-like elastic component and the end of the floating element that is connected to the column-like elastic component are both provided with an internal thread, and the internal threads both match with the external threads.

Optionally, in the foregoing optical fiber flow sensor, metalized film coating is performed at a surface of the optical fiber detection component.

Optionally, in the foregoing optical fiber flow sensor, the glass solder is heated and melted via high-frequency induction.

Optionally, in the foregoing optical fiber flow sensor, a sealing ring is provided at a location where the housing is connected to the fixed sealing joint via thread.

Optionally, in the foregoing optical fiber flow sensor, the sensitive element includes a multi-core fiber grating, an F-P cavity and a laser.

Compared with the prior art, this application has the following beneficial effects.

This application provides an optical fiber flow sensor. The optical fiber flow sensor includes: a housing, an elastic component, an optical fiber detection component, a floating element, and a fixed sealing joint. The elastic component includes a first elastic member and a second elastic member that are symmetrical to each other and are disposed in a closely fitted manner. Moreover, fitting surfaces of the first elastic member and the second elastic member that are in contact with each other are both provided with a seating groove, with the two seating grooves being corresponded to each other. After the first elastic member and the second elastic member are combined and both ends of the elastic component are respectively fixed to the fixed sealing joint and the floating element, the seating grooves on the two elastic members form a sealed space. The optical fiber detection component in this application can be disposed in the sealed space formed by the seating grooves. The optical fiber detection component is encompassed by the elastic component, so as to prevent the optical fiber detection component from being in direct with an external fluid such as water, oil, or an oil-water mixture, thus preventing the optical fiber detection component from being damaged by corrosion, hydrogen loss, or the like. Meanwhile, both ends of the optical fiber detection component maybe welded in the seating grooves by a glass solder. Fuse welding is carried out by using a glass solder having an expansion coefficient close to that of an optical fiber, so as to avoid an inaccurate measurement caused by a high-temperature creep deformation of the glue and thermal mismatch, or even a failure of the optical fiber flow sensor. In addition, the elastic component is encompassed in the housing, and one end of the housing is fixed to the fixed sealing joint via thread. The housing further functions to protect the elastic component and the optical fiber detection component. Compared with the prior art, the optical fiber flow sensor in this application can be adapted to severe environments of high temperatures, high corrosion, and the like, and has a long service life.

It should be understood that the foregoing general descriptions and detailed descriptions below are merely exemplary and explanatory, and cannot limit this application.

BRIEF DESCRIPTION OF THE DRAWINGS

To more clearly describe the technical solutions of this application, the accompanying drawings to be used in the embodiments are briefly explained below. Obviously, persons of ordinary skills in the art can also derive other accompanying drawings according to these accompanying drawings without an inventive effort.

REFERENCE NUMBERS

1 Housing
11 Sealing Ring
2 Elastic Component
21 First Elastic Member
22 Second Elastic Member
23 Seating Groove
231 First Seating Portion
232 Second Seating Portion
24 First Fixing Hole
25 External Thread
3 Optical Fiber Detection Component
31 Optical Fiber
32 Sensitive Element
4 Floating Element
41 Third Fixing Hole
5 Fixed Sealing Joint
51 Second Fixing Hole
6 Glass Solder

DETAILED DESCRIPTION OF THE EMBODIMENTS

To make a person skilled in the art better understand the technical solutions of this application, the technical solutions in the embodiments of this application are clearly and completely described below in combination with the accompanying drawings in the embodiments of this application. Obviously, the described embodiments merely illustrate some embodiments of this application and do not show all embodiments. According to the embodiments in this application, all other embodiments derived by persons ordinarily skilled in the art without an inventive effort pertain to the protection scope of this application.

An optical fiber flow sensor is more and more widely applied to engineering fields of seas, oilfields, and the like due to its advantages of high sensitivity, anti-electromagnetic interference, being easy for wavelength division multiplexing, and the like. Therefore, it is of great significance to ensure that the optical fiber flow sensor can be used for a long-run monitoring in severe environments such as an oil well and seawater.

Figure 1:
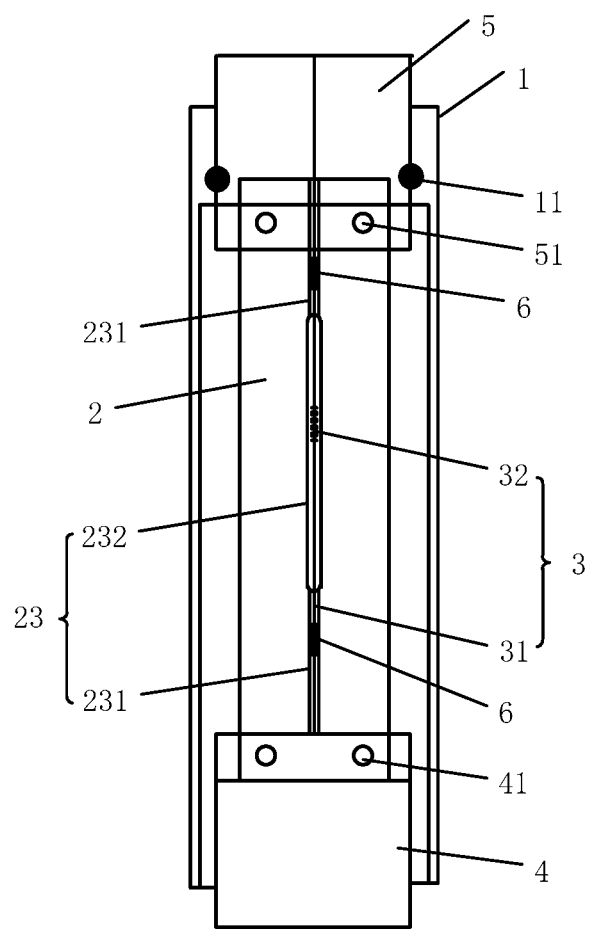
FIG. 1 is a left view of an optical fiber flow sensor according to an embodiment of the present application.
Figure 2:
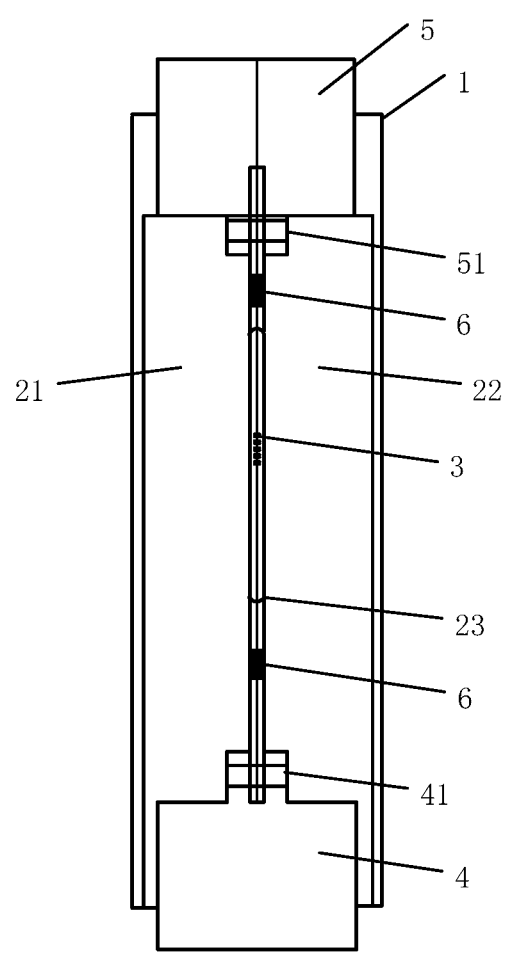
FIG. 2 is a front view of the optical fiber flow sensor according to an embodiment of the present application.

Reference can be made to FIG. 1 and FIG. 2. FIG. 1 is a left view of an optical fiber flow sensor according to an embodiment of the present application, and FIG. 2 is a front view of the optical fiber flow sensor according to an embodiment of the present application. In combination with FIG. 1 and FIG. 2, it may be seen that the optical fiber flow sensor in this application includes: a housing 1, an elastic component 2, an optical fiber detection component 3, a floating element 4, and a fixed sealing joint 5.

Specifically, the elastic component 2 includes a first elastic member 21 and a second elastic member 22 that are symmetrical to each other and are disposed in a closely fitted manner. The two elastic members are both provided with a seating groove 23, and the respective surfaces provided with the seating grooves 23 are abuttedly fitted with each other for sealing. The two seating grooves 23 correspond to each other. One end of the elastic component 2 is fixed at the fixed sealing joint 5, and the other end is fixed at the floating element 4. After the first elastic member 21 and the second elastic member 22 are combined, and both ends of the elastic component 2 are respectively fixed at the fixed sealing joint 5 and the floating element 4, the seating grooves 23 on the two elastic members form a sealed space. Further, to firmly bond the two elastic members, in this application, the first elastic member 21 is welded to the second elastic member 22, and the two welded elastic members 21, 22 seal the optical fiber detection component 3 therein.

The optical fiber detection component 3 in this application can be disposed in the sealed space formed by the seating grooves 23 in the elastic component 2. The elastic component 2 encloses the optical fiber detection component 3 to prevent the optical fiber detection component 3 from being in direct with an external fluid such as water, oil, or an oil-water mixture, and prevent the optical fiber detection component from being damaged by corrosion, a hydrogen loss, or the like. In this way, a service life of the optical fiber flow sensor is prolonged.

Meanwhile, after the optical fiber detection component 3 is disposed in the seating grooves 23, both ends of the optical fiber detection component 3 are welded in the seating grooves 23 by a glass solder 6. In this application, fuse welding is performed by using a glass solder 6 having an expansion coefficient close to that of the optical fiber, so as to avoid an inaccurate measurement caused by a high-temperature creep deformation of the glue and thermal mismatch, or even a failure of the optical fiber flow sensor. The glass solder 6 is heated and melted through high-frequency induction. Heating through high-frequency induction enables the glass solder to be uniformly and quickly heated with a high working efficiency.

In addition, the elastic component 2 is embedded in the housing 1, and one end of the housing 1 is fixed at the fixed sealing joint 5 through a thread. The housing 1 further has a function of protecting the elastic component 2 and the optical fiber detection component 3. To further ensure a sealed connection, a sealing ring 11 is disposed at a position where the housing 1 is threadedly connected to the fixed sealing joint 5.

Compared with the prior art, the optical fiber flow sensor in this application prevents the optical fiber detection component from being in direct contact with an external fluid, thus preventing the optical fiber detection component from being damaged by corrosion, hydrogen loss, or the like. Meanwhile, the optical fiber detection component as such avoids a high-temperature creep deformation of the glue and thermal mismatch. In this way, the optical fiber flow sensor can be adapted to severe environments of high temperatures, high corrosion, and the like, has a long service life, and can be used for permanent monitoring.

Figure 4:
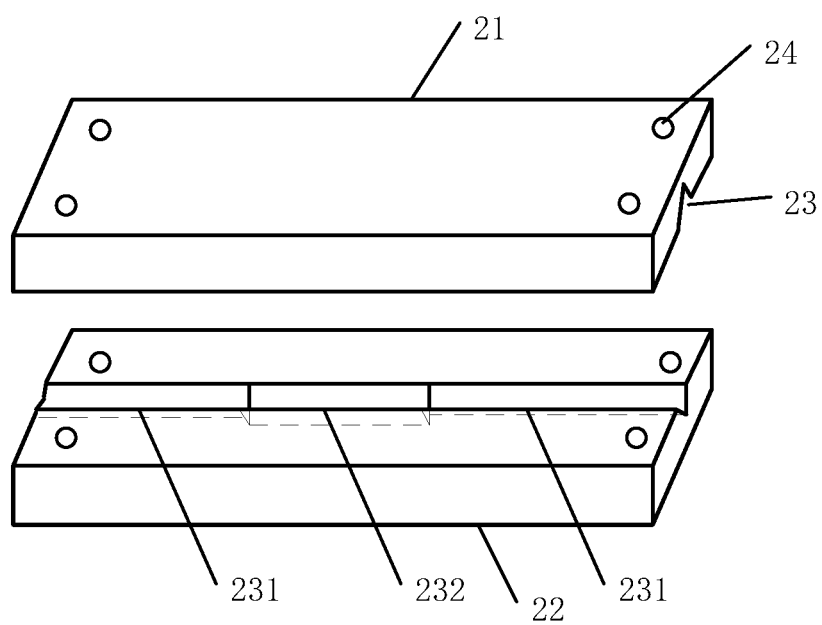
FIG. 4 is a basic schematic structural diagram of the elastic component according to an embodiment of the present application.
Figure 5:
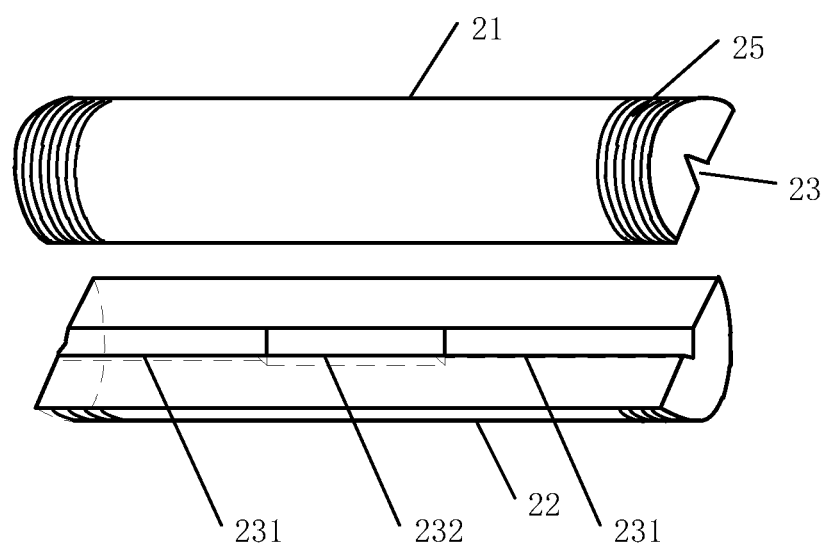
FIG. 5 is a basic schematic structural diagram of another elastic component according to an embodiment of the present application.

To further optimize the foregoing technical solutions, the seating groove 23 in this application includes a first seating portion 231 and a second seating portion 232. Reference can be made to FIG. 4 and FIG. 5. FIG. 4 is a basic schematic structural diagram of an elastic component according to an embodiment of the present application; and FIG. 5 is a basic schematic structural diagram of another elastic component according to an embodiment of the present application. FIG. 4 and FIG. 5 respectively show a sheet-like elastic component and a column-like elastic component provided in embodiments of the present application. In these embodiments, a middle portion of the seating groove 23 is the second seating portion 232, and both ends of the seating groove 23 form the first seating portion 231.

Further, the first seating portion 231 has a size matching with diameters of the fibers 31 at both ends of the optical fiber detection component 3, and is configured for welding the fibers 31 at both ends of the optical fiber detection component 3. The fibers 31 welded via the glass solder 6 are closely bonded with the first seating portion 231, further ensuing sealed packaging of a sensitive element 32. The second seating portion 232 has a size larger than that of the sensitive element 32 in the optical fiber detection component 3, and is configured to accommodate the sensitive element 32 of the optical fiber detection component 3. It should be noted that it needs to be ensured herein that the sensitive element 32 is packaged in the second seating portion 232 in a suspended manner. In this case, phenomena such as chirping may be avoided, thus avoiding a final detection error.

In this application, the sensitive element 32 includes multi-core fiber gratings, an F-P cavity and a laser, and the like. Because a width of the sensitive element 32 is greater than the diameter of the opticals 31, the size of the second seating portion 232 is greater than that of the first seating portion 231. For example, by using the multi-core fiber gratings as sensing members, a strain value when an elastic gauge deforms under stress can be detected, and strain values at different positions of the first elastic member and the second elastic member my be simultaneously detected. Detection errors caused by sensing members provided at different locations may be eliminated by interpolation or averaging.

In this application, during packaging of the elastic component 2 and the optical fiber detection component 3, taking a two-core fiber grating as an exemplified multi-core fiber grating, one core of the fiber grating may be first placed into the seating groove of the first elastic member 21. A position of the fiber grating is adjusted to place a gate region of the fiber grating into the second seating portion 232, and then the fibers at one end thereof are placed into the first seating portion 231 in the seating groove 23. The fibers pass through the glass solder 6. The glass solder 6 is melted via high-frequency induction so as to weld the fiber into the first seating portion 231. Similarly, fibers at the other end of the fiber grating also pass through glass solder 6, and are placed into another first seating portion 231 of the seating groove 23. Pigtails of the fiber grating are clamped by a fiber clamp. The pigtails pass through a through-hole of the fixed sealing joint 5, and are connected to a demodulation instrument. Prestress is applied to the two-core fiber grating by adjusting the fiber clamp. The glass solder 6 is heated and melted through high-frequency induction, so as to weld the fiber into the first seating portion 231. Another core of the fiber grating is welded into the seating groove of the second elastic member 22 by using the same method. After fiber gratings are welded on the two elastic members, two surfaces, provided with the seating grooves, of the elastic members are bonded together for welding. The fiber grating in the first elastic member 21 is provided for measuring a tensile variable, and the fiber grating in the second elastic member 22 is provided for measuring a compression variable. The seating groove of the first elastic member 21 and the seating groove of the second elastic member 22 are corresponded to each other, and thus can be used to measure the tensile/compression variation at the same position, so that the final measurement result becomes more accurate. Two fiber gratings are disposed in the elastic component 2, so that temperature influence during strain detection can be eliminated.

Figure 3:
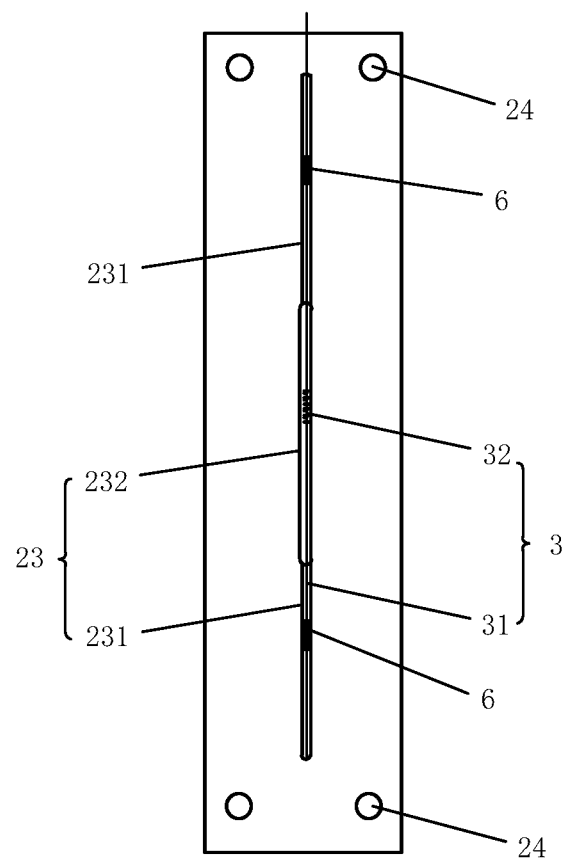
FIG. 3 is a front view of an elastic component according to an embodiment of the present application.

FIG. 3 is a front view of an elastic component according to an embodiment of the present invention. Reference is made in combination to FIG. 3 and FIG. 4. In this application, both ends of the sheet-like elastic component are provided with first fixing holes 24, and the sheet-like elastic component is respectively connected to the floating element 4 and the fixed sealing joint 5 through the first fixing holes 24 at the two ends. Correspondingly, one end of the fixed sealing joint 5 that is connected to the sheet-like elastic component is provided with second fixing holes 51. During connection, the sheet-like elastic component extends into the fixed sealing joint 5. The first fixing hole 24 and the second fixing hole 51 are aligned, and matching screws are used for fixing. Similarly, when one end of the floating element 4 that is connected to the sheet-like elastic component is provided with third fixing holes 41. During connection, the sheet-like elastic component extends into the floating element 4, the first fixing hole 24 and the third fixing hole 41 are alinged, and then screws are used for fixing connection.

Reference is made to FIG. 5. In this application, both ends of the column-like elastic component are provided with an external thread 25. One end of the fixed sealing joint 5 that is connected to the column-like elastic component is provided with an internal thread, and one end of the floating element 4 that is connected to the column-like elastic component is also provided with an internal thread. The two ends of the column-like elastic component are respectively directly connected to and fixed to the floating element 4 and the fixed sealing joint 5 through the mating internal threads and external threads.

Further, the foregoing floating element 4 and elastic component 2 may be relatively easily detached or assembled due to a mechanical connection therebetween. Therefore, a floating element of a proper shape, such as a column-type floating element, an airfoil-type floating element, or the like, may be selected according to requirements of a tester. For example, an airfoil-type floating element can reduce resistance of a fluid, thereby avoiding a measurement error caused by a sudden change in flow velocity. The tester can fix the airfoil-type floating element onto the elastic component 2 through a screw according to requirements.

In addition, in this application, a metalized coating film is provided at a surface of the optical fiber detection component 3. The optical fiber detection component 3 is metalized by coating a thin metal film at the surface thereof. The optical fiber detection component 3 has an expansion coefficient that is close to an expansion coefficient of the elastic component 2. Under a temperature variation, the optical fiber detection component 3 may have the same expansion/contraction ratio with the first elastic member 21 and the second elastic member 22, thereby avoiding a thermal mismatch phenomenon, and further avoiding an inaccurate monitoring result or a failure phenomenon of the optical fiber flow sensor.

The foregoing implementations are all described with reference to and in combination with other manners. Difference embodiments all have same parts, and for same or similar parts between the embodiments in this specification, reference may be made to each other. Details are not described herein.

It should be noted that in this specification, relationship terms such as "first" and "second" are merely used to distinguish one entity or operation from another entity or operation, and are not necessarily intended to require or imply any actual relationship or sequence between these entities or operations. Moreover, terms such as "comprise", "include", or any other variant thereof are intended to cover non-exclusive inclusion, so that a circuit structure, an object, or a device including a series of elements not only includes those elements, but also includes other elements that are not explicitly listed, or further includes inherent elements of the circuit structure, object, or device. Without more limitation, an element defined by a statement "including one . . . " does not exclude that other same elements exit in the circuit structure, object, or device including the elements.

A person skilled in the art would easily conceive of other implementation solutions of this application after considering the specification and practicing the invention disclosed herein. This application is intended to cover any variation, use, or adaptive change of the present invention. These variations, uses, or adaptive changes follow the general principle of this application and include the common general knowledge or common technical means in this technical filed that is not disclosed in this application. The specification and the embodiments are merely considered as exemplary, and the actual scope and spirit of this application are indicated in the content of the claims.

The foregoing implementations of this application do not constitute any limitation on the protection scope of this application.

What is claimed is:

1. An optical fiber flow sensor, wherein the optical fiber flow sensor comprises: a housing, an elastic component, an optical fiber detection component, a floating element, and a fixed sealing joint, wherein
    the elastic component comprises a first elastic member and a second elastic member that are symmetrical to each other and are disposed in a closely fitted manner, with the fitting surfaces of the first elastic member and the second elastic member being respectively provided with a seating groove, and the two seating grooves corresponding to each other;
    one end of the elastic component is fixed at the fixed sealing joint, and the other end is fixed at the floating element;
    the optical fiber detection component is disposed in the seating groove, with both ends of the optical fiber detection component being welded onto the seating groove by glass solder; and
    the elastic component is enclosed in the housing, and one end of the housing is fixed at the fixed sealing joint via thread.

2. The optical fiber flow sensor according to claim 1, wherein the seating groove comprises a first seating portion and a second seating portion, with a middle portion of the seating groove forming the second seating portion and the two ends of the seating groove forming the first seating portion;
    the first seating portion is configured for welding fibers at both ends of the optical fiber detection component, and the second seating portion is configured for accommodating a sensitive element in the optical fiber detection component in a suspended manner; and
    a size of the first seating portion matches with a diameter of the fiber, and a size of the second seating portion is greater than that of the sensitive element.

3. The optical fiber flow sensor according to claim 1, wherein the first elastic member is welded to the second elastic member.

4. The optical fiber flow sensor according to claim 1, wherein the elastic component comprises a sheet-like elastic component and a column-like elastic component.

5. The optical fiber flow sensor according to claim 4, wherein both ends of the sheet-like elastic component are provided with a first fixing hole, one end of the fixed sealing joint that is connected to the sheet-like elastic component is provided with a second fixing hole, and one end of the floating element that is connected to the sheet-like elastic component is provided with a third fixing hole, with the second fixing hole and the third fixing hole respectively corresponding to the first fixing holes at two ends of the sheet-like elastic component, wherein screws are respectively used for fixed connection.

6. The optical fiber flow sensor according to claim 4, wherein both ends of the column-like elastic component are provided with an external thread, the end of the fixed sealing joint that is connected to the sheet-like elastic component and the end of the floating element that is connected to the column-like elastic component are both provided with an internal thread, and the internal threads both match with the external threads.

7. The optical fiber flow sensor according to claim 1, wherein metalized film coating is performed at a surface of the optical fiber detection component.

8. The optical fiber flow sensor according to claim 1, wherein the glass solder is heated and melted via high-frequency induction.

9. The optical fiber flow sensor according to claim 1, wherein a sealing ring is provided at a location where the housing is connected to the fixed sealing joint via thread.

10. The optical fiber flow sensor according to claim 2, wherein the sensitive element comprises a multi-core fiber grating, an F-P cavity and a laser.

\* \* \* \* \*